United States Patent Office 3,340,160
Patented Sept. 5, 1967

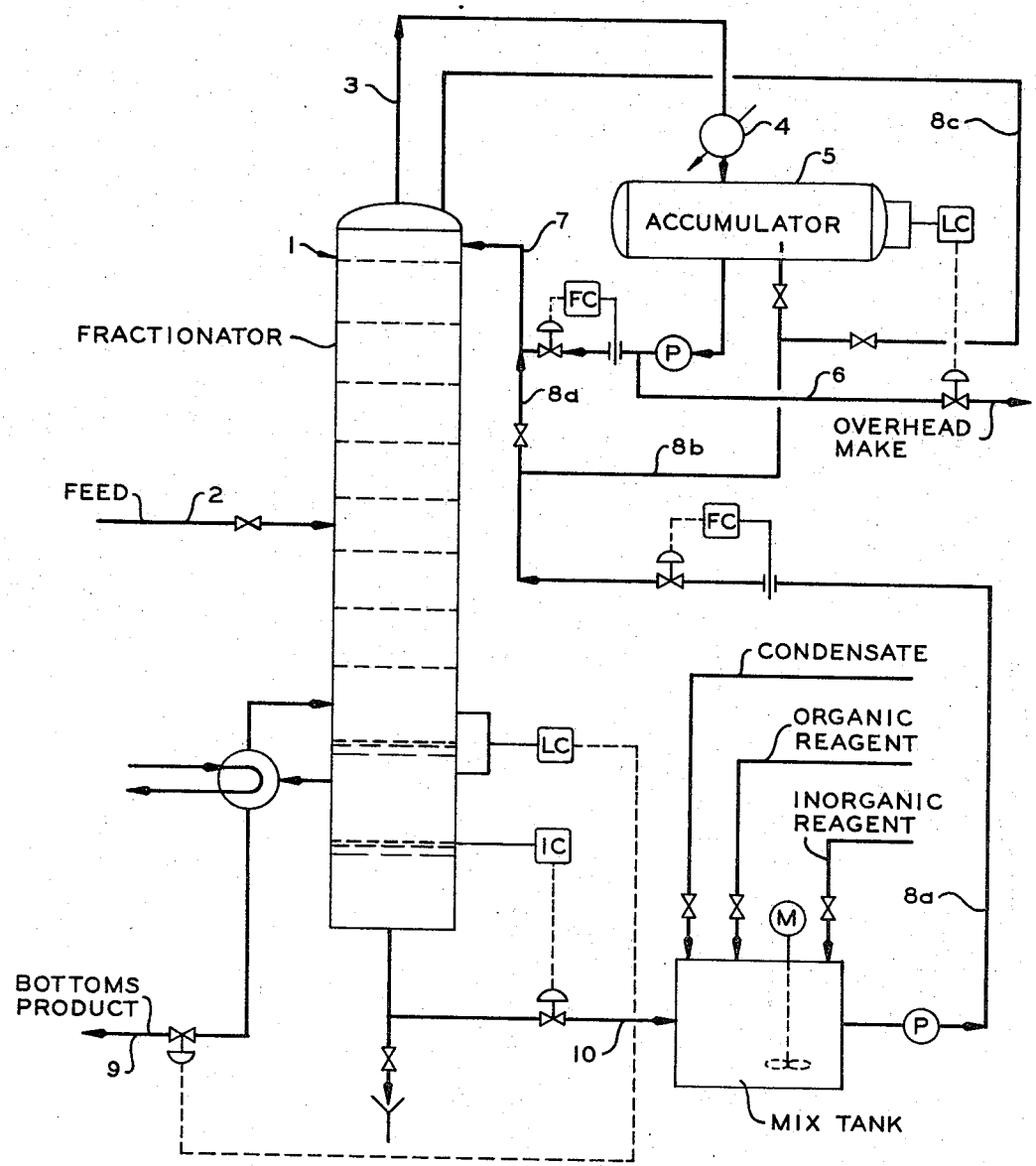

3,340,160
COMPOSITION AND METHOD FOR INHIBITING THE FORMATION OF POLYMERS DURING FRACTIONAL DISTILLATION
Roy M. Waldby, Berkeley, N.J., assignor to Phillips Petroleum Company, a corporation of Delaware
Filed June 23, 1964, Ser. No. 377,256
14 Claims. (Cl. 203—9)

ABSTRACT OF THE DISCLOSURE

Olefin polymerization inhibitor comprising an aqueous solution of an alkali metal nitrite and a water soluble compound containing a radical selected from the group consisting of quinoid, nitro, amino and phenol.

This invention relates to the inhibition of polymerization. It also relates to a method of prohibiting the formation of a polymer in a fractionation zone which comprises adding a water soluble polymerization inhibitor to the fractionation zone. In one aspect it relates to a method of prohibiting the formation of undesirable polymers in a distillation zone and in other processing equipment, wherein quantities of olefin and/or diolefin containing fluids are processed, which comprises adding to said zone or processing equipment a water soluble polymerization inhibitor in a solution of an alkali metal nitrite. In another aspect the invention relates to the use of water soluble compounds selected from the group consisting of nitro, amino, quinoid, and phenol radical containing compounds, to inhibit polymerization in a system also containing an alkali metal nitrite. In a further aspect of the invention, it relates to a novel composition for inhibiting the polymerization of olefins in a fractionation zone, distillation zone, or other processing equipment which may be in contact with olefin and/or diolefin containing fluids comprising a water solution of an alkali metal nitrite and a water soluble compound containing a radical selected from the group consisting of quinoid, amino, nitro, or phenol. In a now preferred embodiment, the water soluble inhibitor is diethanol amine and the alkali metal nitrite is sodium nitrite.

In the fractionation or distillation of olefins there forms on fractionation trays, reboilers, and other processing equipment undesirable polymers which tend to have a deleterious effect on the fractionation or distillation operation. These polymers are self-propagating and are insoluble in normal organic solvents such as benzene and carbon tetrachloride. In order to operate at optimum conditions, the units must be periodically shut down and cleaned. In some cases, there is circulated in the fractionation system, for example, an aqueous solution of sodium nitrite which acts as oxygen scavenger as well as a polymerization inhibitor. However, polymerization still occurs to the extent that costly shut down and cleaning are required periodically.

I have found that the addition to a circulating alkali metal nitrite solution of a water soluble compound, which has a radical selected from the group consisting of quinoid, phenol, nitro, and amino compounds, tends to prevent the formation of polymers in the distillation or fractionation zone and in other related equipment where polymer formation is a problem considerably reducing if not completely inhibiting polymer formation. Such equipment includes reboilers and pipe lines connecting the reboilers with the fractionation zone or distillation zone.

An object of the invention is to prevent the formation of polymers. Another object of the invention is to prevent the formation of polymers in a fractionation zone, distillation zone and in other equipment where polymers normally form when olefin and/or diolefin containing mixtures are fractionated. More specifically, it is an object to prevent formation of ethylene, propylene, and/or butadiene polymers in their respective fractionation or treating processes. It is a further object to inhibit polymerization of ethylene, propylene, or butadiene in their respective fractionation zones and in the lines and reboilers associated therewith.

Other aspects, objects and the several advantages of this will be apparent to one skilled in the art from this disclosure, the drawing and the appended claims.

According to the present invention there is provided a process for combining the addition of water soluble compounds containing a radical selected from the group consisting of quinoid, nitro, amino, and phenol to an alkali metal nitrite solution employed to inhibit polymerization in an olefinic, diolefinic, or unsaturated or polymerizable material treating zone, reboilers, and lines associated therewith.

The concentration of the nitrite, for example, sodium nitrite, in the aqueous solution to which the named compounds are added may vary from 0.005 to 5 percent by weight of solution but usually about 0.05 to 0.5 percent solution is preferable. The concentration of the polymerization inhibitor in the alkali nitrite solution may vary from 0.1 to 1 percent by weight of solution, but a 0.25 percent solution is preferable. More than one of the named compounds can be added to the same nitrite solution. The volume ratio of the aqueous treating reagent to the hydrocarbon feed to the fractionator is in the range of 1:100 to 1:5000, preferably about 1:1000.

Examples of quinoid compounds which can be used in the alkali metal nitrite solution are quinone and 1,4-naphthoquinone.

Examples of nitro compounds which can be used are p-dinitrobenzene, m-dinitrobenzene, o-dinitrobenzene, nitrobenzene, and p-nitrotoluene.

Examples of useful amino compounds are N,N-di-n-butylhydroxylamine, 2,4-diaminodiphenylamine, diethanolamine, and monoethanolamine.

Examples of phenol compounds which can be used are catechol, thymol, hydroquinone, and phenylhydroxylamine.

The above lists of compounds are in no way intended to be a limiting enumeration, but rather only to serve as examples of useful compounds.

The accompanying drawing schematically illustrates one embodiment of the invention. Referring to the drawing, an olefin mixture enters fractionation zone 1 through line 2. A lower boiling point fraction is removed via line 3 at the top of fractionation zone and is passed through condenser 4 and passes into overhead accumulator 5. The purified overhead product is removed via line 6 and the condensed liquid is returned as reflux through line 7. Sodium nitrite-diethanolamine solution is added to the reflux liquid in conduit 7 through line 8a. However, sodium nitrite-diethanol amine solution can be added to overhead accumulator 5 through line 8b, and, it is obvious that the sodium nitrite-diethanol amine solution can be added at other suitable places in the system such as, for example, by line 8c into the top of the fractionation zone 1. Higher boiling point hydrocarbons are removed from fractionation zone 1 through line 9 while the sodium nitrite-diethanol amine solution is removed from fractionation zone 1 via line 10 and is recycled to the reflux in line 7 via line 8a.

In the accompanying diagrammatic drawing reference to some of the equipment such as pumps, gages and other equipment which obviously would be necessary to actually operate the process have been intentionally omitted. Only sufficient equipment has been shown to illustrate the process of the invention.

The following compounds used in a 0.20 percent by weight sodium nitrite aqueous inhibitor solution produce treating agents which substantially completely prevent the formation of polymers from propylene-containing hydrocarbon in a depropanizing tower operated at:

| | |
|---|---|
| Top temperature, ° F. | 120 |
| Bottom temperature, ° F. | 250 |
| Pressure, p.s.i.g. | 250 |
| Inhibitor solution to feed vol. ratio | 1:1000 |

| Additional Reagent | Wt. Percent of Total Inhibitor Solution | Result* |
|---|---|---|
| Diethanolamine | 0.25 | No polymer. |
| Quinone | 0.25 | Do. |
| Nitrobenzene | 0.25 | Do. |
| Catechol | 0.25 | Do. |
| None added | | Polymer forms. |
| 0.50 wt. percent $NaNO_2$ only | | Do. |

*Trays and reboiler zones.

Thus, it can be seen from the foregoing examples that the use of nitro, amino, phenol, and quinoid containing compounds in combination with an aqueous sodium nitrite solution effectively inhibits the polymerization of polymer-formers in a propylene-containing hydrocarbon fluid.

Although this specification has been limited to the prevention of polymerizing butadiene, propylene, and ethylene, it is obvious to one skilled in the art that the inhibitors of this invention could be used in combination with an alkali metal nitrite to inhibit the formation of polymers from other monomers.

Examples of other monomers for which the invention could be applied are butenes, propadiene, pentenes, etc.

Reasonable variation and modification are possible within the scope of the foregoing disclosure, the drawings and the appended claims to the invention, the essence of which is that there have been provided a method and composition for inhibiting the polymerization during fractionation of propylene, ethylene and butadiene, the method which comprises adding a water soluble compound containing a radical selected from the group consisting of quinoid, nitro, amino and phenol to a circulating aqueous solution of an alkali metal nitrite in a fractionator; the composition comprising a minor amount of a polymerization inhibiting compound having a radical selected from the group consisting of quinoid, nitro, amino and phenol and a major amount of an alkali metal nitrite solution.

I claim:

1. A method for inhibiting the formation of polymers from monoolefins or diolefins in a fractionation zone comprising adding to a circulating aqueous solution of an alkali metal nitrite in said fractionation zone .1 to 1 percent by weight of said aqueous solution of at least one compound which has a radical selected from the group consisting of quinoid, nitro, amino, and phenol, said compound having polymerization inhibiting properties when in combination with said aqueous solution of said alkali metal nitrite.

2. A method according to claim 1 wherein the said monoolefin or diolefin is selected from the group consisting of ethylene, propylene, butene, pentene, propadiene, and butadiene.

3. A method according to claim 1 wherein the monoolefin is selected from the group consisting of ethylene and propylene.

4. A method according to claim 1 wherein the said alkali metal nitrite is sodium nitrite.

5. A method according to claim 1 wherein the polymerization inhibitor is diethanol amine.

6. A method according to claim 1 wherein the polymerization inhibitor is quinone.

7. A method according to claim 1 wherein the polymerization inhibitor is nitrobenzene.

8. A method according to claim 1 wherein the polymerization inhibitor is catechol.

9. A composition for inhibiting the formation of polymers from nonoolefins or diolefins in a fractionation zone and in lines and in reboilers associated therewith, said composition comprises
   (a) an aqueous metal nitrite solution containing .005 to 5 percent alkali metal nitrite by weight of solution and,
   (b) .1 to 1 weight percent of solution of a polymerization inhibiting compound containing radicals selected from the group consisting of quinoid, nitro, amino and phenol.

10. A composition of claim 9 wherein the said polymerization inhibiting compound is diethanol amine.

11. A composition of claim 9 wherein the said polymerization inhibiting compound is quinone.

12. The composition of claim 9 wherein the said polymerization inhibiting compound is nitrobenzene.

13. The composition of claim 9 wherein the said polymerization inhibiting compound is catechol.

14. The composition of claim 9 wherein the said alkali metal nitrite is sodium nitrite.

References Cited
UNITED STATES PATENTS

| | | | |
|---|---|---|---|
| 2,613,175 | 10/1952 | Johnstone et al. | 203—9 |
| 2,730,489 | 1/1956 | Lewis | 203—9 |
| 2,809,155 | 10/1957 | Suehler | 203—9 |
| 2,900,421 | 8/1959 | Kharasch et al. | 203—9 |
| 3,260,766 | 7/1966 | Nudenberg et al. | 260—677 |

NORMAN YUDKOFF, *Primary Examiner.*

WILBUR L. BASCOMB, JR., *Assistant Examiner.*